(12) United States Patent
Gibbins et al.

(10) Patent No.: US 7,688,997 B2
(45) Date of Patent: Mar. 30, 2010

(54) NON-MOTION DETECTION

(75) Inventors: Daniel Gibbins, Stirling (AU); Michael John Brooks, Clarence Park (AU); Garry Newsam, Salisbury Park (AU)

(73) Assignee: Iomniscient Pty Ltd, Gordon - New South Wales (AU)

( * ) Notice: Subject to any disclaimer, the term of this patent is extended or adjusted under 35 U.S.C. 154(b) by 1181 days.

(21) Appl. No.: 10/496,424

(22) PCT Filed: Nov. 21, 2002

(86) PCT No.: PCT/AU02/01574

§ 371 (c)(1),
(2), (4) Date: Sep. 28, 2004

(87) PCT Pub. No.: WO03/044752

PCT Pub. Date: May 30, 2003

(65) Prior Publication Data

US 2005/0036658 A1    Feb. 17, 2005

(30) Foreign Application Priority Data

Nov. 21, 2001    (AU) ..................................... PR8994

(51) Int. Cl.
*G06K 9/00*    (2006.01)
*H04N 7/18*    (2006.01)
(52) U.S. Cl. .................... 382/103; 382/107; 348/143
(58) Field of Classification Search ............ 382/103, 382/107, 218; 348/143–160
See application file for complete search history.

(56) References Cited

U.S. PATENT DOCUMENTS

| 4,249,207 | A | | 2/1981 | Harman et al. |
| 5,164,992 | A | | 11/1992 | Turk et al. |
| 5,500,525 | A | * | 3/1996 | Saban ........................ 250/221 |
| 5,694,491 | A | | 12/1997 | Brill et al. |
| 5,710,833 | A | | 1/1998 | Moghaddam et al. |
| 6,292,575 | B1 | * | 9/2001 | Bortolussi et al. ........... 382/118 |
| 6,625,310 | B2 | * | 9/2003 | Lipton et al. ................ 382/173 |
| 6,661,918 | B1 | * | 12/2003 | Gordon et al. .............. 382/173 |

(Continued)

FOREIGN PATENT DOCUMENTS

EP    0639820    2/1995

(Continued)

OTHER PUBLICATIONS

Harville et al., "Adaptive Video Background Modeling Using Color and Depth", 2001, IEEE, pp. 90-93.*

(Continued)

*Primary Examiner*—Aaron W Carter
(74) *Attorney, Agent, or Firm*—Townsend and Townsend and Crew LLP

(57) ABSTRACT

An image sequence derived from area surveillance is considered as a collection of independent time series, each of which describes an image feature that summarizes a small neighborhood of the image. These time series are regarded as samples from some underlying distribution, and statistical techniques are used to identify the density function of this distribution. The background can then be identified as a feature of this distribution, moreover the distribution of features in subsequent image frames can be monitored to see if it deviates sufficiently from the current distributions to indicate a change in the background.

15 Claims, 24 Drawing Sheets

U.S. PATENT DOCUMENTS

| | | | |
|---|---|---|---|
| 6,731,799 B1 * | 5/2004 | Sun et al. | 382/173 |
| 6,741,977 B1 * | 5/2004 | Nagaya et al. | 707/1 |
| 6,870,945 B2 * | 3/2005 | Schoepflin et al. | 382/103 |
| 6,999,600 B2 * | 2/2006 | Venetianer et al. | 382/103 |
| 7,536,032 B2 * | 5/2009 | Bell | 382/107 |
| 2001/0004400 A1 * | 6/2001 | Aoki et al. | 382/107 |
| 2002/0122570 A1 * | 9/2002 | Paragios et al. | 382/103 |
| 2003/0044045 A1 * | 3/2003 | Schoepflin et al. | 382/103 |
| 2004/0151374 A1 * | 8/2004 | Lipton et al. | 382/181 |
| 2005/0104964 A1 * | 5/2005 | Bovyrin et al. | 348/155 |

FOREIGN PATENT DOCUMENTS

| | | |
|---|---|---|
| EP | 0805426 | 11/1997 |
| GB | 2337146 A | 10/1999 |
| WO | WO 81/01935 A1 | 7/1981 |
| WO | WO 92/02892 A1 | 2/1992 |
| WO | WO 98/56182 A | 12/1998 |
| WO | WO 00/31560 A2 | 6/2000 |

OTHER PUBLICATIONS

Stauffer C., Grimson W.E.L. Adaptive background mixture models for real-time tracking, IEEE Conference Proceedings, Jun. 23, 1999, vol. 2, pp. 246-252.

* cited by examiner

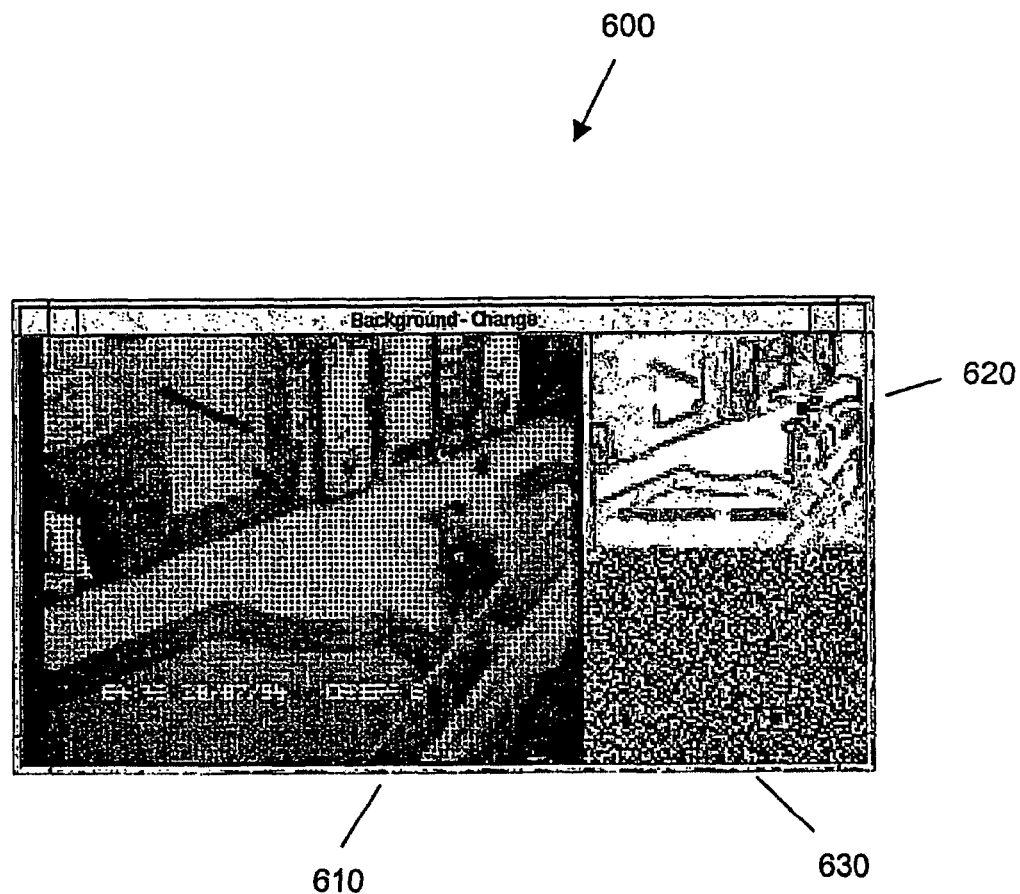
FIG. 6.1

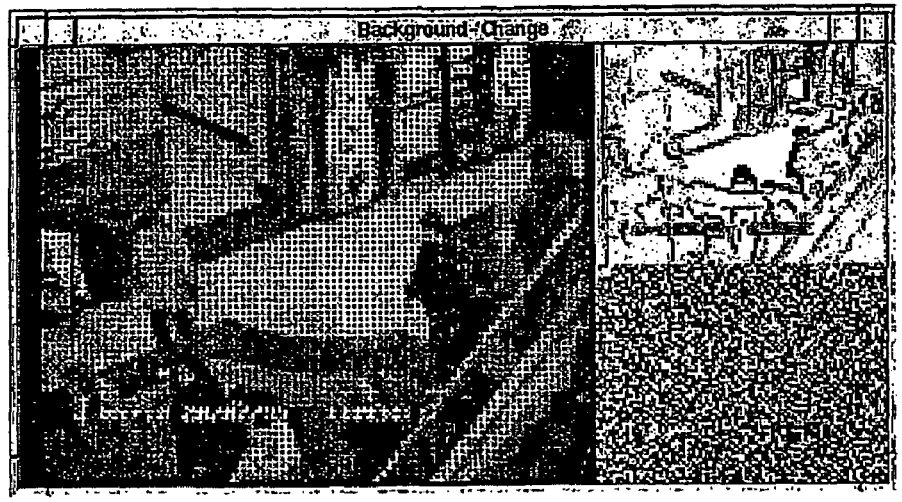
FIG. 6.2

FIG. 6.3

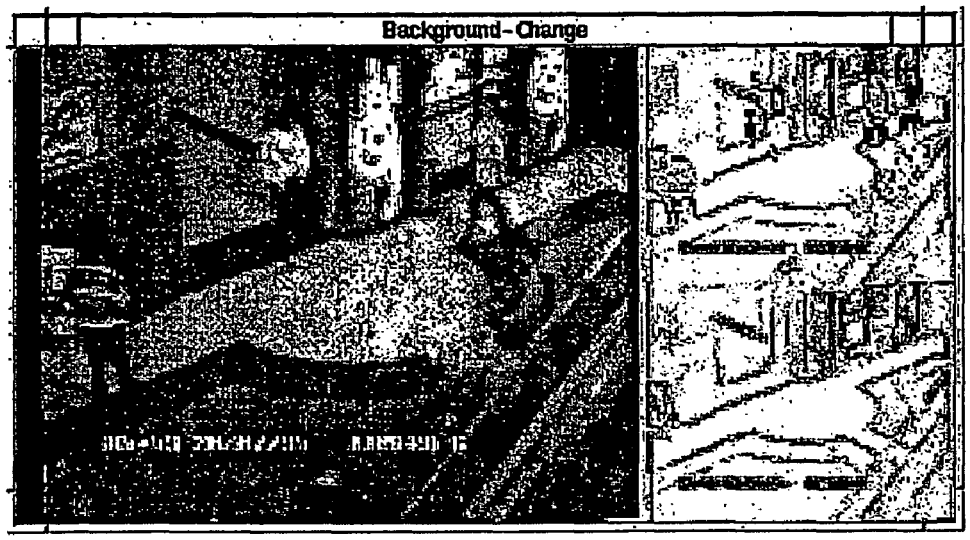
FIG. 6.4

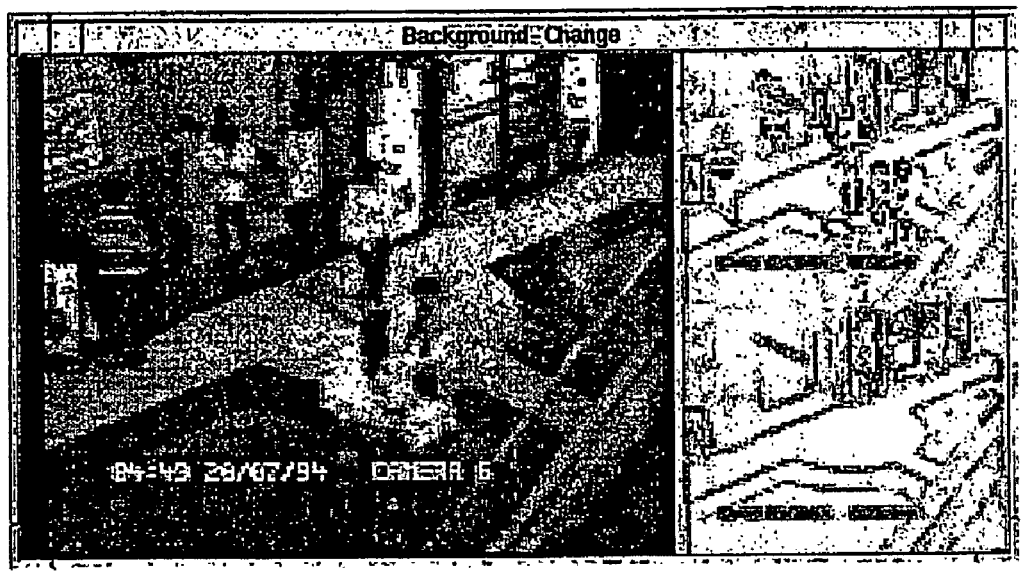
FIG. 6.5

FIG. 6.6

FIG. 6.7

FIG. 6.8

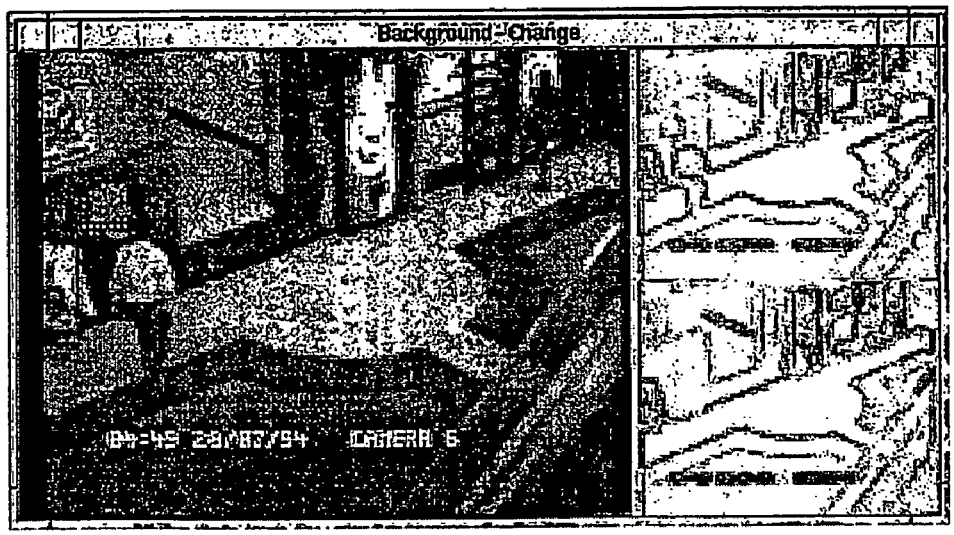
FIG. 6.9

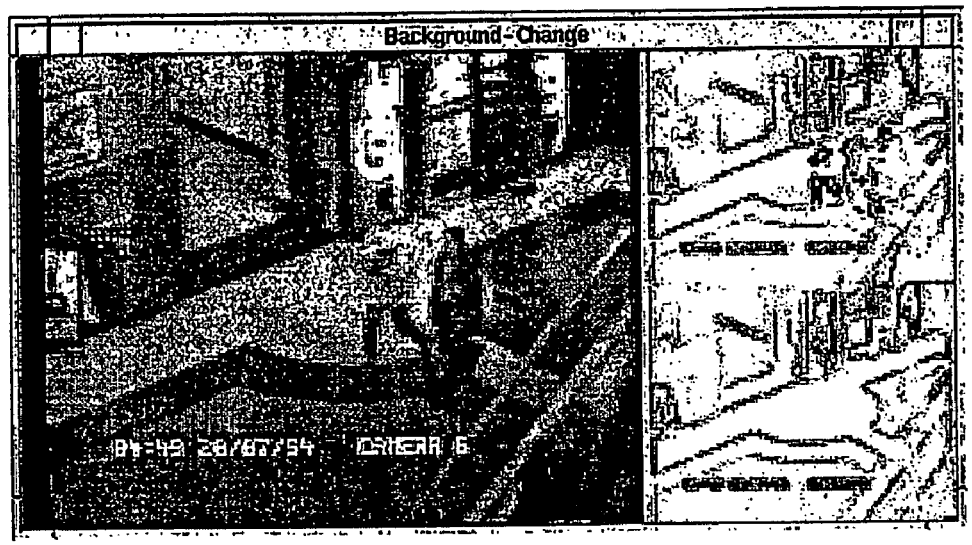
FIG. 6.10

FIG. 6.11

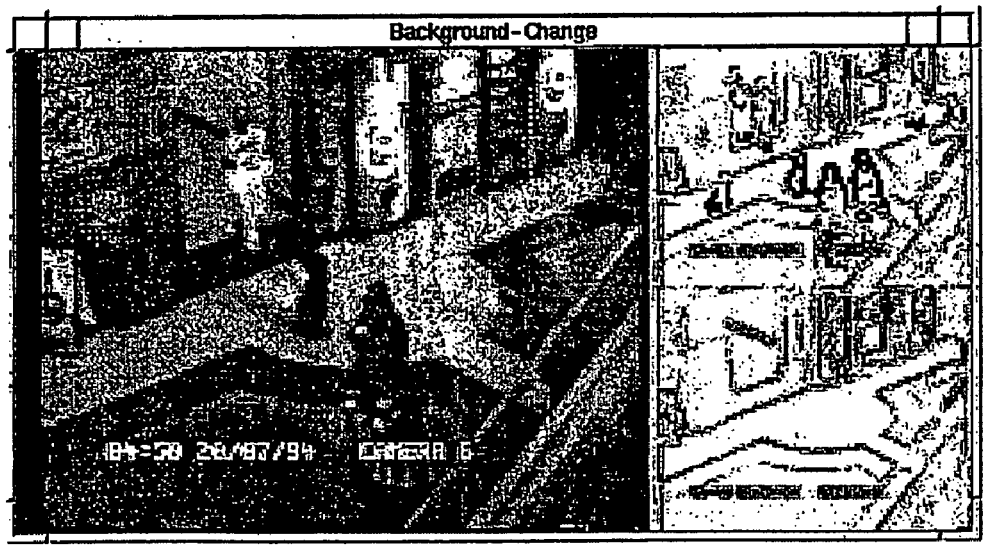
FIG. 6.12

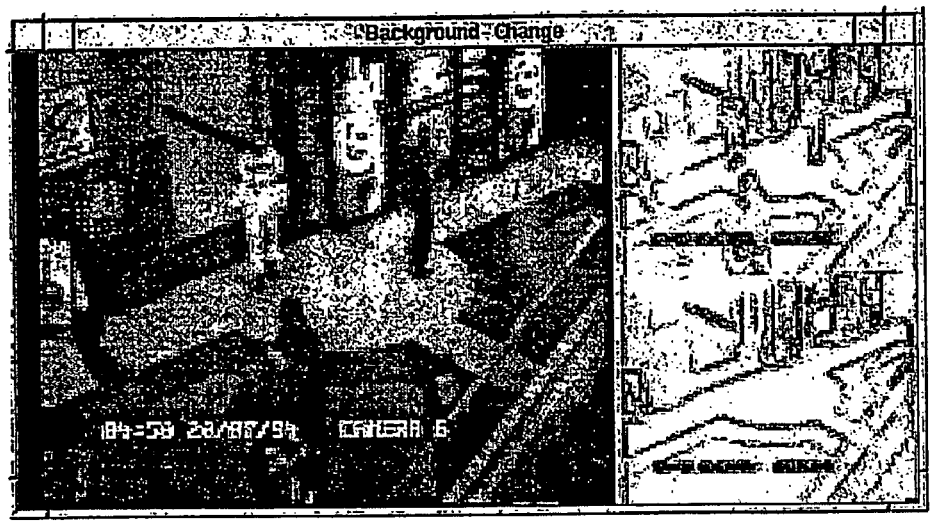
FIG. 6.13

NON-MOTION DETECTION

FIELD

Techniques for detecting changes in the background of image sequences, which may contain significant motion, are described herein.

BACKGROUND

Electronic surveillance of areas and locations to detect changes in the background, either by the addition of new objects into a particular scene or the removal of stationary objects, has various applications. Some examples include:
(a) detecting suspicious packages or abandoned luggage in airports or other transportation terminals,
(b) monitoring valuables in museums, art galleries or other secure areas,
(c) monitoring traffic flow at busy intersections, or detecting blocked road tunnels and bridges, and
(d) monitoring parking areas.

Current methods of surveillance include a human operator monitoring various areas by the use of closed circuit television. This invariably leads to human operator error or fatigue, especially so when the operator is confronted with a dynamic scene such as a busy airport terminal. These scenes typically contain a number of moving people (or vehicles) that regularly occlude the background. As a result, stationary objects in a particular scene can be obscured for some significant periods of time by moving objects.

Furthermore, a transient object in a particular scene may often pause for short periods of time, such as a person stopping to purchase or enjoy a drink or a car waiting before entering traffic flow. Such temporary pauses are of course, not genuine changes to the background.

Automatic image detection systems ideally operate in real-time, produce few false alarms, and are capable of operating using existing hardware, typically current cameras and computing platforms.

In view of the above observations, a need clearly exists for an image analysis techniques that at least addresses deficiencies of visual motion surveillance systems.

SUMMARY

Consider an image sequence as a collection of time series. In the simplest case, each time series simply records changes in the 8-bit greylevel of a pixel. More generally, a simple operator can be applied to neighbourhoods across the image to produce a series of processed images. The time series are then the output of this operator on each neighbourhood. Any changes in the background can be thought of as identifying a function of this distribution that corresponds to the background. This distribution can be monitored to determine if the feature changes. Statistical techniques can be used to determine whether the background is reliably identified, or whether a change is significant.

As a simple illustration, consider the problem of estimating the background scene in an image sequence containing only small amounts of motion or movement. Typically, a camera is stationary, and the environment is constant. Lighting levels are unchanging. The distribution of grey levels at a single pixel over time can be thought of as being a mixture of two distributions: (i) one distribution reflecting the essentially static background, and (ii) the other distribution reflecting transient objects, such as passing people.

If the distribution of greylevels of transients is roughly uniform while the background is essentially unchanging, so that its distribution is nearly a delta impulse function. That is, transients do not vary significantly from frame to frame. The background is thus the most frequently appearing value in each of the time series. In other words, the background is be the mode of the distribution. Thus, a change in the background is indicated by a change in this mode.

Therefore, by analysing the distribution of incoming features over time, one can first identify the background from the distribution of feature values and then detect changes to this background through changes in the distribution.

The problem is helpfully recast in language that allows access to a range of existing statistical techniques. In particular, suppose that a point p in the scene and instant t in time the detection system observes a feature $O_{p,t}$. This feature varies as people or objects move through the scene past a stationary background, and also of the background changes. This behaviour is modelled as a random process, with $O_{p,t}$, being assumed to be distributed defined by Equation [1] below.

$$O_{p,t} = \begin{cases} b_p + \epsilon_t : & \text{with prob } q_p \\ f_{p,t} + \epsilon_t : & \text{with prob } 1 - q_p \end{cases} \quad [1]$$

In Equation [1] above, $b_p$ represents the background feature at p, $f_{p,t}$ represents some non-background feature (such as a transient object), which can in turn be modelled as another random variable with distribution function $D_p(f)$. The term $\epsilon_t$ represents noise.

The two problems of background estimation and non-motion detection can now be formally stated as problems in estimation theory and hypothesis testing as follows:
Infer $b_p$ from a sequence of $T_E$ observations $O_{p,t}$
Given $b_p$ and a sequence of $T_D$ observations $O_{p,t}$ test the hypothesis that $b_p$ has changed.

The model above assumes that feature observation at each point p and time t are independent. This model can be easily extended, however, to incorporate correlation in space and time. Similarly, more than one feature might be used.

Although the model may seem overly formal for the practical problem of non-motion detection in a wide variety of scenes, the probability is unlikely to be known beforehand, and indeed will probably vary with time. Further, formalising the problem clarifies the issues in constructing non-motion detectors. Formalisation also links the problem to the large body of existing theory and results on statistical estimation procedures.

DESCRIPTION OF DRAWINGS

FIGS. 6.1 to 6.13 are respectively screen shots of 13 sequential frames, and corresponding processed images used in the motion detection system.

DETAILED DESCRIPTION

Detection System

Figure 1:
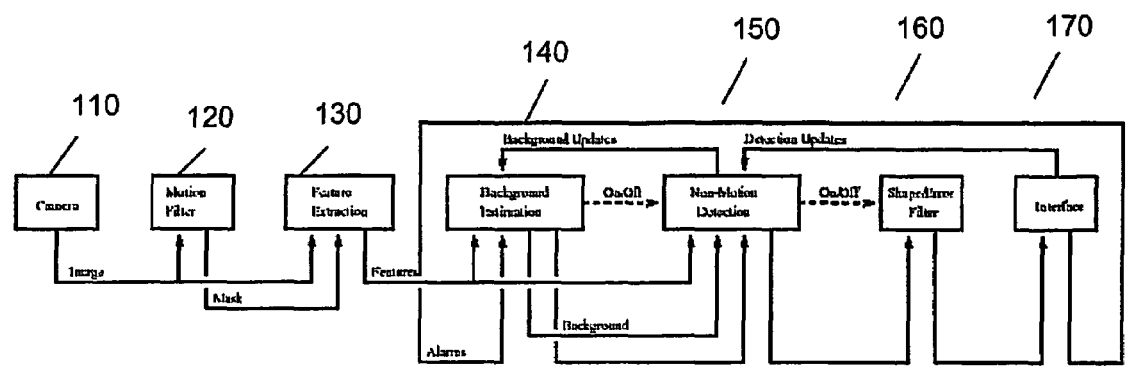
FIG. 1 is a block view of the system overview of the non-motion detection system described herein.

FIG. 1 represents, in overview, the operation of the motion detection system described herein. In broad terms, the input image captured by a camera 110 first passes through an enhancement stage, which is not shown. A motion filtering operation 120 and feature extraction operations 130 are then applied. The order in which these operations 120, 130 are performed is not important.

The feature array is then passed to a background estimator 140. This process continues repeatedly until a reliable background estimate is obtained, at which point the detection module 150 becomes active. The detection module 150 outputs any changes to an array of alarm states that circulate around the background estimator 140 and remaining modules 150, 160, 170.

Given a set of alarm states the shape filter module 160 is intended to pick out detection of the required shape or form (such as a suitcase) and to eliminate obvious misdetections (false alarms). Any detection alarms that do not satisfy criteria specified by the shape filter 160 have their alarm states altered. The alarm states finally pass on to the user interface 170.

Detection Algorithm

Figure 2:
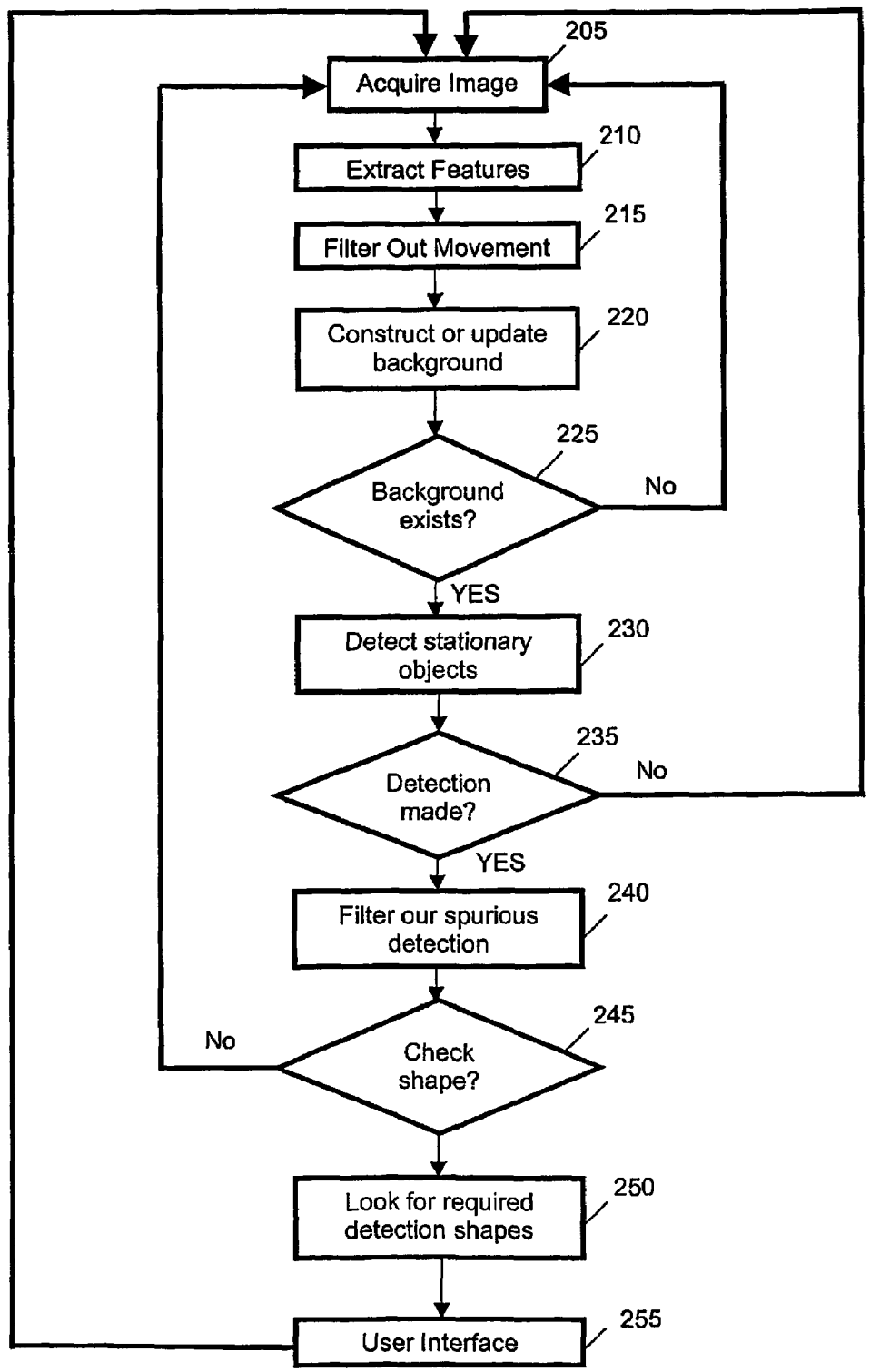
FIG. 2 is a flowchart of an algorithm used by the non-motion detection system described herein.

FIG. 2 flowcharts an overview of an algorithm for the non-motion detection system is described. A more detailed description of technical considerations and particular algorithmic steps is provided below. Table 1 presents a pseudocode implementation that corresponds with the flowchart of FIG. 2. Corresponding steps are indicated in FIG. 2 and Table 1.

The following contains the basis pseudo-code of the proposed system of detection. The algorithm of the overall detection cycle can be summarised in the pseudocode presented in Table 1.

TABLE 1

| | |
|---|---|
| WHILE not quit | |
|    Acquire Image | (step 205) |
|    Extract Features | (step 210) |
|    Filter Out Movement | (step 215) |
|    Construct or update background estimate based on features. | (step 220) |
|    IF background estimate exists | (step 225) |
|       Detect stationary objects | (step 230) |
|       IF detection made THEN | (step 235) |
|          Filter out spurious detection | (step 240) |
|          IF check shape THEN | (step 245) |
|             Look for required detection shapes | (step 250) |
|    User Interface | (step 260) |

In FIG. 2 and Table 1, an image is acquired in step 205. Features are extracted in step 210, and movement is filtered from the image in step 215. A background image is constructed or updated in step 220. If a suitable background image is found to exist in step 225, stationary objects are detected in step 230. If a suitable background image does not exist in step 225, processing returns to step 205, so that further images can be acquired and features extracted and movement filtered out.

If a detection is made in step 235, spurious detections are filtered out. If a check is be made of shape in step 245, the shape of the detection is matched against predetermined shape criteria in step 250. If predetermined criteria are satisfied, the user interface is appropriately alerted or updated. Particular steps outlined below are described algorithmically in greater detail below.

In overview, for each incoming frame, the image is divided into N by M subregions. A value is extracted from each subregion representing some feature that is measured (for example, a texture). For each subregion of the image, the measured values are used to construct a representation of the probability density function pdf) of the measured values by constructing, for example, a histogram or other convenient representation.

If required, previous frames can be compared to eliminate feature values associated with any obvious movement. The background is estimated as the most frequent feature value is in each pdf, which is re-estimated at regular intervals. This estimate, and its updates, are desirably constructed from a long sequence of images.

Once a background estimate is available, for each subregion, a second pdf is constructed whenever the incoming feature value does not correspond to the estimated background.

This second pdf is reset if the background reappears (that is, becomes significant in the second pdf). After sufficient time is allowed to construct the second pdf, examine the peaks of the pdf and compare these peaks with the background. If a significant shift/change occurs, register the region as a potential change. If the potential change is still present at the critical detection time, then mark region as changed. If the background is still not visible at some time after the critical detection time, yet no significant peak is present in the pdf, register the region as either an alarm or as otherwise requiring human decision.

If a change is detected, check to determine whether this change is isolated or part of a cluster of changes. If desired, compare cluster's size and shape to that which you are trying to detect (for example, a "suitcase-sized" shape). Register an alarm if the region satisfies this constraint.

Image Enhancement

The image enhancement module, which for convenience is not represented in FIG. 1, operates on input images prior to extracting particular features and generally improves detection of features such as edges. Furthermore, in real practical terms one finds that image enhancement is desirable due to the quality of the original input image from the camera 110. To improve the images, any one or more of a variety of image enhancement techniques may be used, such as histogram equalisation.

Image enhancement can noticeably improve feature discrimination and detection. Since histogram equalisation is sensitive to scene changes, the process should only be applied periodically to typical images, and look-up tables determined by these equalisations then be applied to intervening input images. Such a regime ensures that feature vectors for the same object in successive scenes do not fluctuate due to changes elsewhere in the image.

One should also be careful that over-equalisation does not occur, since this may have an undesirable effect on the extraction of some of the features. Smoothing the histogram prior to equalisation may not always reduce this effect. An alternative is to base equalisation upon the square root of the histogram.

Motion Filtering

Both background and non-moving objects are by definition stationary. Accordingly, only stationary features are used in background estimation and non-motion detection. A filter can then be used to mask out features $O_{p,t}$ that have recently changed, improving both the background estimation and target detection in busy scenes. A simple motion filter can then be implemented, whereupon current and previous frames are compared. Regions of significant change are marked as regions that are likely to contain motion, and such regions are excluded from further consideration.

This form of motion filtering can be implemented both as a pre-feature and post-feature process. When applied as a pre-feature process, a greyscale differencing procedure can be applied to each pixel. Thus, for example, if more than 60% of the feature region contains changes, the region is marked as containing movement. For post-feature processing, the current feature is simply compared to the previous feature.

Feature Extraction

Feature extraction can be used to track changes in each individual pixel of the original image. In practical terms, though, this is not possible due to the excessive computation loads placed on the detection system. Accordingly, one may choose to track features $O_{p,t}$ at a subset of pixel's p. This not only reduces the computational load, but also has the added advantage that the features can now be computed as functions of all the pixel's in a window about p. The resulting features can thus be constructed to be more robust with respect to noise or other extraneous influences, and also be tuned to optimise the performance of the estimation and detection procedures.

Feature Definition

Before defining the various features the following notation is introduced. I denotes the L×W matrix of pixel intensities that constitute the image, so that $I_{I,j}$ denotes the intensity of the (i,j)-th pixel. $N_{I,j}$ denotes a neighbourhood centered on the (i,j)-th pixel, in accordance with Equation [2] below.

$$N_{i,j} \equiv \{(p,q): |p-i|, |q-j| < K\} \quad [2]$$

In Equation [2] above, K defines the size of the neighbourhood. Typically the image will be tiled by a collection $\{N_{iK, jK} : 1 \leq i \leq L/K-1, 1 \leq j \leq W/K-1\}$ of overlapping neighbourhoods. On each of these neighbourhoods a single feature or a feature vector is calculated. This calculation summarises the behaviour of the image in the neighbourhood, and reduces the amount of data that needs to be considered at later stages. Overlap of neighbourhoods ensures that significant objects within the image that are not aligned with the feature sampling grid are still captured.

Next, $N_{ij}$ denotes the set of pixel values in the neighbourhood $N_{ij}$. That is, $N_{ij} \equiv \{I_{p,q}: (p, q) \in N_{ij}\}$. Smoothing and edge filters are now defined as follows. Given coefficients k and c and the function $g(x, y) = ke^{-(x^2+y^2)/c}$, the smoothing kernel $G_{ij}$ on a neighbourhood $N_{ij}$ is defined by Equation [3] below.

$$G_{ij} \equiv \{g(i-p, j-q): (p, q) \in N_{ij}\}. \quad [3]$$

The associated edge filters $G_x$ and $G_y$ and the zero crossing filter $G_\Delta$ are defined in Equations [4] to [6] below.

$$[G_x]_{i,j} \equiv \left\{ \frac{\partial g(i-p, j-q)}{\partial x} : (p,q) \in N_{i,j} \right\} \quad [4]$$

$$[G_y]_{i,j} \equiv \left\{ \frac{\partial g(i-p, j-q)}{\partial y} : (p,q) \in N_{i,j} \right\} \quad [5]$$

$$[G_\Delta]_{i,j} \equiv \left\{ \frac{\partial^2 g}{\partial^2 x} + \frac{\partial^2 g}{\partial^2 y}(i-p, j-q) : (p,q) \in N_{i,j} \right\} \quad [6]$$

For simplicity, the subscripts (i, j) are omitted unless necessary, so that N and N denote a generic neighbourhood $N_{>,|}$ and the collection $N_{i,j}$ of pixel values on this neighbourhood.

In the example system, the coefficients k and c are typically in the order of 8.0 and $0.3K^2$ respectively. These values are chosen to ensure both satisfactory coverage of the neighbourhood N, and reasonable approximation when reducing the operator to an array of discrete values.

The basic operations on neighbourhoods used to define features are as follows. First $\overline{N}$ denotes the mean intensity value of the neighbourhood N, defined by Equation [7] below.

$$\overline{N} \equiv \frac{1}{(2K+1)^2} \sum_{(p,q) \in N} I_{pq} \quad [7]$$

A⊗B denotes the sum of products over a neighbourhood N, as defined by Equation [8] below.

$$A \otimes B \equiv \sum_{(p,q) \in N} A_{pq}.B_{pq}, \quad [8]$$

A⊖B denotes the sum of differences, as defined by Equation [9] below.

$$A \ominus B \equiv \sum_{p,q \in N} A_{pq} - B_{pq} \quad [9]$$

A number of feature operators can be used, as outlined below.

Averaging $O_{p,t} = \overline{N}$. This operator is simple to calculate, well distributed and relatively invariant to noise. A minor variation is to weight the average by a Gaussian, as defined in Equation [10] below.

$$O_{p,t} = \frac{N \otimes G}{\overline{G}}, \quad [10]$$

In Equation [10] above, $\overline{G} = \Sigma_{p,q \in N} G_{pq}$.

Gradient Gradient can be calculated using Equation [11] below.

$$O_{p,t} = (N \otimes G_x)^2 + (N \otimes G_y)^2 \quad [11]$$

Second Moment Second moment feature extraction is calculated using Equation [12] below.

$$O_{p,t} = N \otimes G_\Delta \quad [12]$$

Combination This feature is a weighted combination of mean brightness and image variance, as defined by Equation [13] below.

$$O_{p,t} = \frac{1}{2}(\overline{N} + \text{var}(N)) \quad [13]$$

In Equation [13] above, var(N) is the variance of pixel values over the neighbourhood N.

A more systematic approach to constructing features $O_{p,t}$ is to require that the features are relatively invariant to certain changes, of which the most important in practice is invariance to changes in overall light levels. Examples of features that are invariant to linear rescalings of intensity values are outlined below.

Edge Angle [14]

$$O_{p,t} = \arctan(N \otimes G_x, N \otimes G_y)$$

Pattern [15]

$$O_{p,t} = \frac{\sum_{p,q \in N} |N_{pq} - \overline{N}|}{\overline{N}},$$

Invariant Gradient [16]

$$O_{p,t} = \frac{N \otimes G_x^+ - N \otimes G_x^-}{N \otimes G_x^+ + N \otimes G_x^-} + \frac{N \otimes G_y^+ - N \otimes G_y^-}{N \otimes G_y^+ + N \otimes G_y^-},$$

In Equation [16] above, $G_x^+$ and $G_y^+$ correspond to filters composed of the positive values of the Gaussian's first derivatives $G_x$ and $G_y$. Similarly $G_x^-$ and $G_y^-$ correspond to filters composed of the negative values.

Invariant Second Moment [17]

$$O_{p,t} = \frac{N \otimes G_*}{N \otimes |G^*| + k},$$

Equation [17] above, $G^*$, instead of the Laplacian of the Gaussian, is defined by Equation [18] below.

$$[G_*]_{i,j} = \left\{ \int_{-a}^{+a} \int_{-\sqrt{a^2-\alpha^2}}^{+\sqrt{a^2-\alpha^2}} \left( \frac{\partial^2 g}{\partial^2 x} + \frac{\partial^2 g}{\partial^2 y} \right) \right. \\ \left. (i-p+\alpha, j-q+\beta) d\beta d\alpha : (p,q) \in N_{i,j} \right\} \quad [18]$$

In Equation [18] above, a≈K/2. This more complex operator is intended to be similar in behaviour to the Laplacian, but less sensitive to factors such as camera jitter, which can severely effect the output near zero crossings.

Invariant Greyscale Let $G^*$ be a smoothing kernel and $N^*$ represent the pixel values over the neighbourhood $N^*$ in Equation [19] below.

$$N^*_{i,j} \equiv \{(p, q) : |p-i|, |q-j| \leq K^*\} \quad [19]$$

In Equation [19] above, $K^* \gg K$. Then, the feature is defined by Equation [20] below.

$$O_{p,t} = \frac{N \otimes G}{\sum_{(p,q) \in N^*} G^*_{pq} \cdot N^*_{pq}} \quad [20]$$

Observe that, in essence, all but one of these operators use total energy to rescale the result of a simpler operator.

Features also have the property of being robust in the presence of noise. In practice the lighting invariant features above are sensitive to noise at low levels, so these features can be regularised by adding appropriate constant δ to the numerators in the expressions above to stabilise them in these situations (for example, the regularised pattern feature is given by Equation [21] below.

$$O_{p,t} = \frac{\sum_{p,q \in N} |N_{pq} - \overline{N}|}{\overline{N} + \delta} \quad [21]$$

The regularisation features are no longer strictly invariant, but as their values at low light levels are unreliable anyway, the trade-off between invariance and robustness is acceptable, if δ can be kept small.

Finally, the histogram-based techniques for background estimation and non-motion detection described below operate most satisfactory if the output of the feature operators is evenly distributed across the range of possible values. This maximises the discriminating power of the histogram-based detection schemes.

Feature Definition Examples

Figure 3:
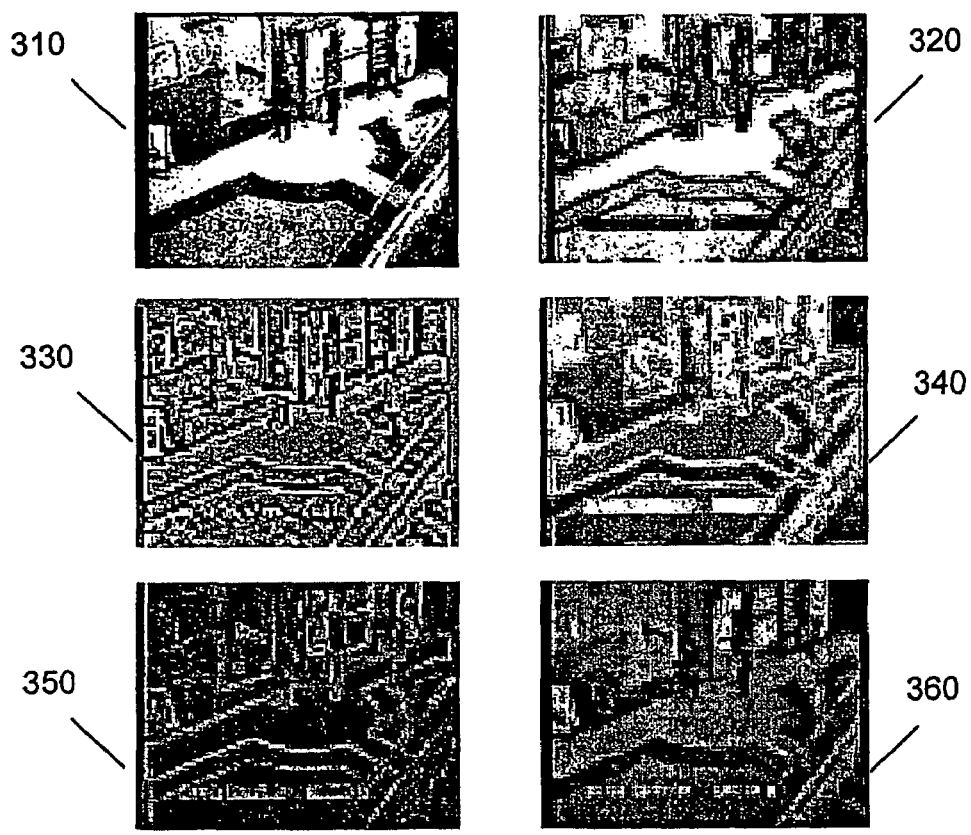
FIG. 3 illustrates the output of the various feature operators of the system.
Figure 4:
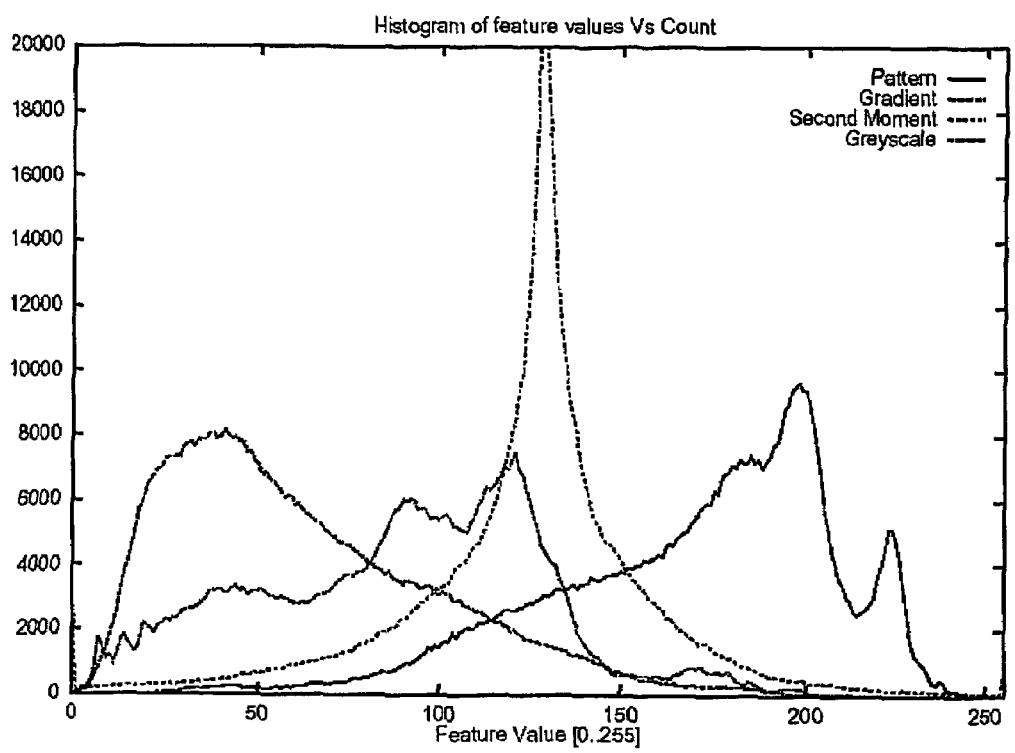
FIG. 4 is a histogram of feature values based on 100 frames of images similar to those of FIG. 3.
Figure 5:
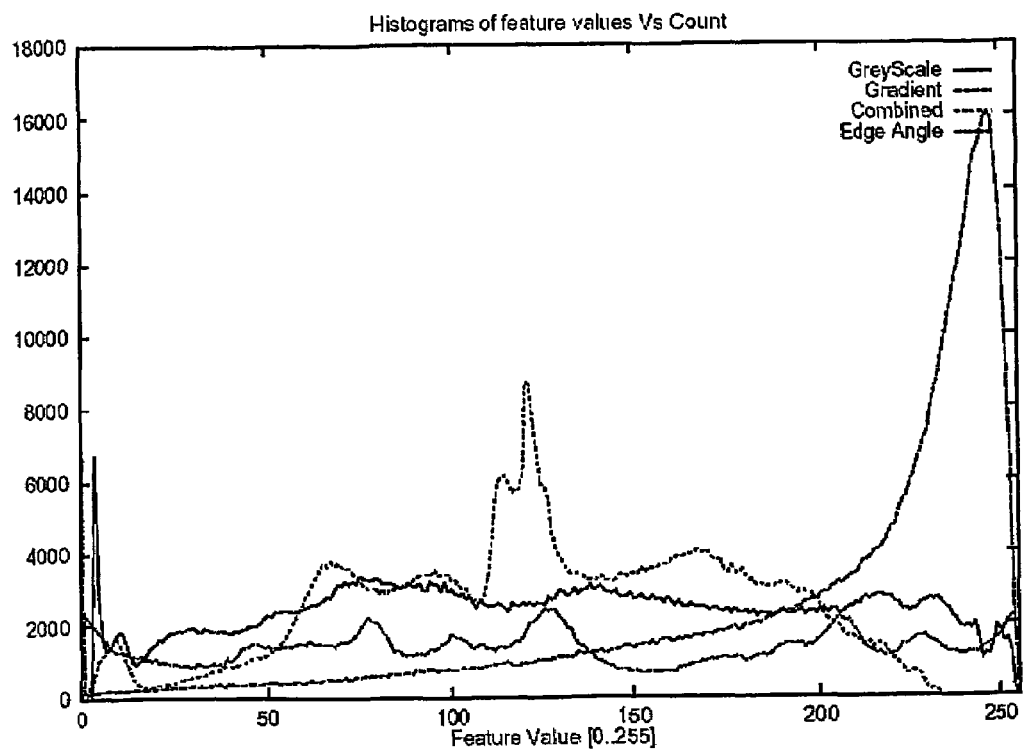
FIG. 5 is a further histogram of other feature values based on 100 frames of images similar to those of FIG. 3.

FIG. 3 illustrates the output of the above-described feature operators. FIG. 3 represents the input image 310, invariant pattern 320, invariant second moment 330, combined averaging and variance 340, invariant gradient 350 and invariant greyscale 360. In each case, the operator is applied to neighbourhoods of 8×8 pixels in size. FIG. 4 and FIG. 5 are both histograms of feature values based on 100 frames of images similar to those represented in FIG. 3.

In general, feature values are not uniformly distributed. This can be improved by appropriate rescaling of the output, such as by taking the square root of the pattern feature, although this is not always a complete remedy.

Although a simple approach, simple averaging features, with either uniform or Gaussian weighting, generally provides well-behaved target detections that are relatively non-computationally demanding and generally insensitive to noise. With variable lighting, however, greylevel values between frames may be too unstable to be reliably used in background estimation and detection. Similarly, the combined greylevel and image variance operator tended to have similar properties.

The pattern operator provides good results, and acts in a similar manner to an edge detector. On the other hand, feature distributions for the gradient and second moment methods can be unsatisfactory, while resealing the outputs to can improve distributions but introduce an unacceptable amount of noise.

The invariant greyscale method provides satisfactory results, and has some of the properties of the simple averaging method. Difficulties can arise in the choice of a larger smoothing kernel, as there is an increase in the computational load. Visually, the operator tends to flatten the original image and produce a "halo" or "ghosting" effect. The output of the edge angle feature operator is uniformly distributed over the interval [0, 2π]. Outputs, however, varied greatly between frames, especially in smooth regions with few edges, making accurate estimation difficult. To take account of this in the detection algorithms described below, a "no feature" bin is included in the histogram. If the edge energy $e=(N\widehat{x}\,G_x)^2+(N\widehat{x}\,G_y)^2$ in the neighbourhood falls below a particular threshold $\epsilon$, this bin is incremented.

Whether the improved resolution got by adding a "no feature" bin outweighed the additional overhead, however, was problematic. For example, the concept of an intermediate "possible edge" is necessary to cover the situation when an edge skirted the threshold level. More promising alternatives are either to increment bins in the histogram by the edge energy rather than by a simple unit, or to increment a weighted spread of bins with the weight proportional to the edge energy and the spread proportional to its inverse. These dampens the effects of large fluctuations in the estimated edge angle observed at low-edge energies.

The non-invariant schemes have difficulty coping with a 25% drop in lighting. For the lighting invariant schemes, however, there is no observable difference between frames before and after the lighting drop, and no change in detection behaviour. Furthermore, beside the edge angle operator, the output of the invariant feature operators tended to be exponentially distributed, as represented in FIGS. 4 and 5.

The invariant gradient and invariant second moment operators tended to amplify noise and although regularisation by the addition of a scalar in the numerator reduced the effect of noise, there was a corresponding loss in resolving power.

Only the averaging feature and its associated invariant tended to provide satisfactory detection results across the whole of an object. The output of the remaining features tended to cluster around the object's periphery unless the object contained strong internal features. Moreover, the other invariant and gradient based features can have difficulty distinguishing between one uniform patch of colour and another.

The regularisation term in the invariant feature operators is partly successful and is most satisfactory when noise levels are low. An increase in noise tends to result in large fluctuations in feature values in the darker areas of the mage. This noise sensitivity is mainly due to a rapid transition in output values, which occurs when the total energy in the operator is small. Increasing regularisation to cope with additional noise also reduces the invariant properties of the operators.

Overall, no one operator is superior to another. Generally, the averaging operator is well suited to constant levels of lighting. Since uniform lighting cannot be guaranteed at all times, the invariant pattern, second moment or greyscale operators may be suitable alternatives. One should also bear in mind that the different operators produce different outputs when applied to the same shapes. This observation should be taken into account if shape filtering is used to post-process detections to remove isolated alarms.

Background Estimation

As discussed above, the modelling of the behaviour can be represented with two equations. The first of these is the observed feature is $O_{p,t}$ equal to $b_p$ which is the background feature plus some noise.

Naive Estimation

Several approaches to the estimation of the background can be taken. The first of these is the naive estimation or the cumulative method. This method estimates the background by treating the background feature like a time exposure photograph. The background estimate is therefore a conglomerate of many, many frames added together in some fashion. If movement is sparse simple methods may be used to estimate the background. An example is given below in Equation [22].

$$b_{p,t}=\lambda b_{p,t-1}+(1-\lambda)f_{p,t} \qquad [22]$$

In Equation [22] above, $f_{p,t}$ is the feature seen at point p and time t, which may suffice in providing a reasonable estimate of the background. When movement is more frequent simple methods tend to produce motion blurs which can seriously affect the accuracy of the background estimate. If motion detection is available, then such moving features can be filtered out of the background estimation process. Without a reliable method of detecting and filtering, however, such a technique is doomed to fail with a scene containing many moving objects.

The performance of this method may be improved by adjusting the current feature by some small but fixed amount, as the weighted sum approach tends to have rather poor convergence properties. Further, the rate at which new features emerge in the background estimate tends to be more consistent. For example, a white block on a black background appears more rapidly in the background estimate than a dark grey block on the same black background.

Distribution-Based Estimation

An alternative preferred method involves distribution-based estimation. The observed feature can be modelled as a mixture of two distributions, namely the background feature and the transient feature. Although there is no reason to expect that either feature will take on any particular value the only a priori expectation is that the background feature distribution is likely to be strongly peaked about some value. Overall, one may prefer to use features that are likely to have a relative uniform distribution of values when applied to transients, and to take the value of the background feature to be the location of the maximum of the overall distribution of feature values. This is, of course, the mode of the distribution.

This approach involves the following steps. Given a sequence of observations $O_{p,t}$, build up an estimate of the distribution of their values. After some sufficient number $T_E$ of image frames, take the estimate $b_p^*$ of the unknown background $b_p$ to be the feature corresponding to the mode of the estimated distribution.

If the occlusion or interference by passing objects is infrequent, the background is clearly the most frequent feature seen. Thus this method is robust in the sense that the estimator still produces the same value as occlusions increase. This method, however, fails once occlusions are sufficiently frequent that some new value then becomes the mode of the histogram. This point of failure depends on both the occlusion rate and the distribution of the transient feature values. In the case where transient features are uniformly distributed then the estimation still works, even though transients may occur much more often than the background.

One should also be aware that since stationary features are most likely to be background features, performance is most likely enhanced by using movement detection to filter out features that have recently changed. This approach works provided that there is not so much movement in the scene that the background is almost always obscured. If, however, movement is frequent then the movement filter may remove almost all observations and essentially starve the detection system of inputs even though the background may still be intermittently visible.

Histogram Method

A further approach to estimating the underlying distribution is to construct a histogram from a large sample of the incoming feature values. In this case, the estimate of the unknown background is simply the address of the histogram bin with the largest number of counters. This embodiment is computationally simple, and produces reasonable results under the right conditions. However, a histogram is a fairly crude distribution estimator, and needs a large number of samples and bins to build up an accurate approximation to the true distribution.

A more sophisticated distribution estimator is the Kernel method. The kernel function is usually some smooth approximation to a delta function with width controlled by the smoothing parameter. The choice of the smoothing parameter in turn depends on the number of samples that are collected. The kernel method has the general form represented in Equation [23] below.

$$D_p^*(f) = \sum_{t=1}^{T_g} \frac{1}{T_E} K(\lambda^{-1}(f - O_{p,t})) \quad [23]$$

In Equation [23] above, K(f) is termed the kernel function and is usually some smooth approximation to a delta function with width controlled by the smoothing parameter $\lambda$. The choice of $\lambda$ in turn depends on the number $T_E$ of samples $O_{p,t}$ that have been collected. In this case $b_p^*$ is the mode of $D_p^*(f)$.

Direct application of the Kernel approach requires storing a large number of frames prior to background estimation. Alternatively, a kernel may be used to add values into a series of bins, equivalent to those of a simple histogram. The bins can be equated to estimates at discrete points along the true distribution, whereupon the accuracy depends on the number of samples taken, the number of histogram slots and the kernel used.

One parameter approach is to take a small Gaussian kernel, with a variance of at least 1.5 times the width of each bin, that is used in conjunction with a small number of bins. This ensures that the peaks located between sample points are not missed during estimation of the mode whilst preserving the relative simplicity of a basic histogram approach.

Continually updating estimates of the background may be necessary if $b_p$ varies over time at a much slower rate than the detection threshold. This may be done by intermittently resealing the histogram, which has the effect of decaying those peaks in the histogram associated with older features.

Accordingly, the basic approach can be modified as follows. Continue to collect histogram data. Update background estimate intermittently. Once the data exceeds some prescribed threshold, scale down the histogram.

Rescaling is dependent upon the rate at which gradual scene changes are expected. As an external parameter this must be specified. The time scale between updates, however, must be much larger than the specified detection time scales, otherwise gradual overall background changes are confused with detection of motion in particular background features.

An alternative to intermittent rescaling and updating is continuous rescaling and updating. For kernel estimators this is done at every step. An example calculation is given in Equation [24] below.

$$D_{p,t}^*(f) = \rho D_{p,t-1}^*(f) + (1-\rho)K(\lambda^{-1}(f - O_{p,t})) \quad [24]$$

In Equation [24] above, the "half-life" parameter $\rho$ reflects the time scale on which the background changes are expected, and the smoothing parameter $\lambda$ now depends on $\rho$. The updated estimate $b_{p,t}^*$ of $b_p$ can also be recalculated at every step.

More generally, various parameters reflect the time scale on which the background changes are expected, and the smoothing parameter now depend on that time scale. The updated estimates can then be recalculated at every step.

Series Estimation

A further alternative to calculating the background estimation is via the series method. The series approximates a Fourier function. This is an alternative to using large set of bins to determine the underlying distribution. The distribution may be approximated by a suitable Fourier series varying within the range of [0, 2π]. A suitable series approximation is given below as Equation [25].

$$D_p(f) \approx \frac{1}{2}\alpha_p(0) + \sum_{k=1,N} \alpha_p(k)\sin kf + \beta_p(k)\cos kf. \quad [25]$$

In Equation [25] above, f varies in some subrange of [0, 2π). One useful property of such a series approximation is represented in Equation [26] below.

$$D_p^{(1)}(f) + D_p^{(2)}(f) = \quad [26]$$
$$\sum_{k=0,N} (\alpha_p^{(1)}(k) + \alpha_p^{(2)}(k))\sin kf + (\beta_p^{(1)}(k) + \beta_p^{(2)}(k))\cos kf$$

Another useful property is the expression presented below as Equation [27], for some constant shift c.

$$D_p(f + c) = \sum_{k=0,N} (\alpha_p(k)\cos kc + \beta_p(i)\sin kc)\sin kf + \quad [27]$$
$$(\beta_p(k)\cos kc - \alpha_p(i)\sin kc)\cos kf$$

Thus an estimate of the distribution based upon the Kernel method can be recomputed each frame by summing the coefficients of the kernel under appropriate translations. This approach can be summarised in Equations [28] and [29] below.

$$\alpha_p^{n+1}(k) = \alpha_p^n(k) + (\alpha^*(k)\cos kf_p^n + \beta^*(k)\sin kf_p^n) \quad [28]$$

$$\beta_p^{n+1}(k) = \beta_p^n(k) + (\beta^*(k)\cos kf_p^n - \alpha^*(k)\sin kf_p^n) \quad [29]$$

In Equations [28] and [29] above, $f_p^n$ is the n-th feature at point p, and $\alpha^*(k)$ and $\beta^*(k)$ are the k-th coefficients of the approximation to the kernel centred upon the origin.

There are many useful properties of such a series approximation. An estimate of the distribution based upon the Kernel method can be recomputed each frame by summing the coefficients of the kernel under appropriate translations.

New estimates of the mode of the distribution can then be computed by sampling the series approximation and noting the maxima. Thus, for a suitable choice of the number of coefficients used, a balance between accuracy and memory requirements can be sought, which can make such an approach a practical alternative.

One of the advantages of this approach is that the background estimate can vary along a full range of values and is not restricted to discrete steps as in the histogram approach. Furthermore, because of the periodicity of such a series approximation, feature values can be made to wrap, or not wraparound, depending on how they are mapped onto the [0, 2TT] range.

Estimating the appropriate kernel size and shape is a major factor in the case of the series method. One can make the assumption that the feature estimation error will be Gaussian in nature. An automatic estimate is then made based on estimation theory and the amount of noise likely to be present in the image data. Assuming most of the variance is due to feature estimation errors caused by noise, the square root of the estimated variance becomes related to the behaviour of noise present in the data.

The optimal size is predicted in accordance with Equation [30] below.

$$h_{opt} = 1.06\sigma n^{-1/5},\qquad [30]$$

In Equation [30] above, $\sigma^2$ is the estimated variance, and n is the number of samples. Assuming most of the variance is due to feature estimation errors caused by noise $\sigma$ becomes related to the behaviour of noise present in the data.

Updating can be easily incorporated into this model by rescaling the coefficients in accordance with Equation [31] below.

$$cD_p(f) = \sum_{k=1,N} c\alpha_p(k)\sin kf + c\beta_p(k)\cos kf. \qquad [31]$$

Thus, Equations [32] and [33] result.

$$\alpha_p^{n+1}(k) = (1=\lambda)\alpha_p^n(k) + \lambda(\alpha^*(k)\cos kf_p^n + \beta^*(k)\sin kf_p^n) \qquad [32]$$

$$\beta_p^{n+1}(k) = (1-\lambda)\beta_p^n(k) + \lambda(\beta^*(k)\cos kf_p^n - \alpha^*(k)\sin kf_p^n) \qquad [33]$$

In Equations [32] and [33] above, $\lambda$ is a constant suitably close to 0. Feature values are added to the distribution and slowly decayed away over time as their importance to the current state of the distribution (which may vary temporally) changes.

Detection Induced Updates

A further point that one needs to consider is the maintenance of reliable estimates of the background. In this case it is necessary to consider how detected objects may, or may not, be incorporated into the background estimates. A number of methods of this may be used including but not limited to the following four:

First, simply resetting the detectors in which case an object may repeatedly set off alarms until the object is incorporated into the background, assuming that background updating is active.

Second, one can simply wait until the object disappears, such as a moving person, during which time associated features in background updates are not used.

Third, the background estimate for the detected region may be reconstructed. If histogram detection techniques are used, the collected histogram can be used as initial data.

Fourth, the background estimate may be modified, along with the associated data collection, to match the features of the detection if they are known. If one uses the second and third methods, there is a time during which subregions of the image are blind.

In an fully operational system, it may be desirable to either adopt a default decision with no user control, or to make control as simple as possible. When there is no user control, any detections may be automatically reset after a time interval that is judged to be sufficient for the user to have noticed them. If user input is acceptable, the user may be able to indicate that the detection should be ignored or incorporated into the background.

One of the factors to be considered in background estimation is an appropriate collection time. Generally, the number of frames used to gather the initial estimate may be many times that of the detection time in order to ensure that semi-stationary objects are not unintentionally included in the background estimate.

Performance

Performance of the background estimation schemes is favourable. Given sufficient frames, the histogram method of background estimation appears both reliable and stable. This is largely independent of the feature types used. As might be expected, the series-based approach produces more accurate estimates of the background than the more discrete histogram counterpart. Of course, such accuracy is at the cost of additional computation and memory. By contrast, comparisons with a naive weighted sum (cumulative) method indicate that such a scheme is generally unsuitable, unless good motion filtering is available and few moving targets are present.

Setting an appropriate collection time is certainly a factor in accurate estimation. The number of frames used to gather the initial estimate is desirably many times that of the detection time, to ensure that semi-stationary objects are not unintentionally included in the background estimate. Some problems also remain when there are two (or more) distinct candidates for the background feature. Such a situation may occur if a stationary object is removed part way through background estimation. From empirical observation, though, this problem occurs seldom. Moreover, if multiple peaks become a significant source of errors, estimation can probably be resolved by extending the detection time.

Background updating is also well behaved. Additional updates tend to dampen minor misdetections. Updating and scaling, however, must keep the number of histogram points at a reasonable level, to ensure that neither transients become included nor that actual changes in the background take too long to appear in the background estimate. The four types of detection-induced updating are also examined. As the "reset" approach has no influence on background updating, this approach is the least intrusive. The "wait on reset" approach is also largely unobtrusive: the only concern with its use relates to maintaining a background estimate. If an object remains stationary for a large period of time, the previous background estimate for that region may no longer be valid due to factors such as lighting changes.

The "reconstruct" approach is perhaps more desirable since this approach result in a more reliable estimate of the new background feature. However, there is no guarantee that the object will not move on before the reconstruction is complete, which leaves the background estimate in an uncertain state. Observe that both the "wait on reset" and "reconstruct" methodologies introduce blind spots into the system: in the case of the "wait on reset" this may be excusable if the detected object is expected to move on in a short period of time. Finally, the "modify" approach, whilst allowing immediate updating and continuing detection is potentially vulnerable to mis-estimation of the correct background feature. Insertion of a peak into the histogram (or some similar "trick") is thus not recommended. If a detection histogram is available then this may be used to replace the background histogram. If no resealing occurs, then aberrations in the initial histogram can be corrected at the next background update.

Non-Motion Detection

Whilst background detection is where the observed feature is equal to the background feature plus some noise, the second problem to consider is whether the observed feature has changed in an image sequence. Four particular techniques are discussed herein. Of these four methods two involve conditional estimation of feature distributions.

Counter Methods

The first method is simply a counter method. Thus if the background is obscured one increments a non-background counter, otherwise one increments a background counter. Both counters are reset when the background counter exceeds a certain threshold. Otherwise, a detection is registered if the non-background counter exceeds some other threshold.

This method quite easily detects image regions that are obscured for some period of time. However, this method fails if any of the features produced by transient objects are the same as those of the background. Further, this method detects a superset of the particular occurrence of interest, since the method responds to motion as well as changes in background.

Thus, this simple method fails in busier scenes, as multiple moving targets are confused with stationary ones. One way to counter the problem, though, is to use motion detection to filter out movement.

Histogram Method

The second method of the histogram method where histogram data is collected at each image region while the background is obscured. If the background reappears the data is reset. Once sufficient points have been collected, one looks for peaks, which exceed some predetermined level. This approach should quickly identify any non-background features and is not readily affected by multiple targets when the background is infrequently obscured.

This method can be further integrated with the background estimation procedure and is less likely to lead to false detections than the counter-based method. This method, however, requires more memory and computational power than simpler methods. Further, the performance of this method degrades when there are a large number of transient features. Detection time generally increases. Finally, this method may fail to detect sufficiently many features from transient objects that coincide with that of the original background.

Histogram with Frame Buffer Method

The third method is an extension of the histogram method and involves a simple timeout. If the histogram size reaches a particular limit without a detection being reported (that is, a large number of frames are examined with no decision reached) the region is reported as a possible detection. This may occur if the background has been obscured for some time, and there may be an object that has been frequently obscured.

A possible variation involves detection time estimation, in which the first and last detection times are associated with each histogram bin. If a feature occurs sufficiently frequently and associated times exceed the prescribed detection time, a detection is registered. The motivation for this approach is that detection times are generally more accurate than histogram size for busier scenes. Generally times tend to err on the side of early detection. If a frequency test is used, detection times increase markedly as motion increased. The drawback is that more memory is required in the detection phase.

Series Method

The third method is series-based and involves the construction of a series representation of the distribution on incoming features. If the distribution becomes significant near points associated with the background, the distribution is reset. If the collection continues too long temporally, a time-out is registered, if accurate timing information is required the time information is represented as a time series and that is collected along with the feature distribution.

The third method is series-based and involves constructing a series representation of the distribution of incoming features. If the distribution becomes significant near points associated with the background, the distribution is reset. If the collection continues too long temporally, a time-out is registered. If accurate timing information is required, the time information is represented as a time series and that is collected, along with the feature distribution.

Further improved performance may be achieved by when an overlapping histogram bin method is used. When a feature falls in a particular bin, both that bin and its immediate neighbours are updated. This smooths the histogram and thus better resolves the peaks that straddle the boundary of adjacent bins, and reduces the effect of noise.

Assuming a reliable background estimate, with a distinct set of target features, all of the above may detect the appearance of a stationary object in a scene containing movement. In the case of very busy scenes, including a time-out test in the histogram methods ensures that a detection is not missed because its features are too infrequent. There is, however, an increase in detection time (up to the time limit) as objects are more frequency obscured. By including timing information in the histogram, one improves the reliability of detection time. But neither histogram frequency or total collection time are sufficiently accurate on their own. Frequency testing along misses detections in busier scenes, and total collection time incurs further false detections and early detections.

Shape Filtering and User Interface

This step is intended to house any post-filtering of the alarm states prior to their arrival at their user interface. Filtering is used to assist in specific size or shape detection occur here.

In brief, a region indicates a detection. The system then checks whether any of the neighbourhoods also registered a detection. If not, the system is reset to indicate an emerging detection. Alternatively, if a very large areas of the image register a detection then a check is performed of whether lighting levels have changed considerably. If so, then those regions are reset.

The above can be understood if one realises that a valid detection comprises at least N adjacent alarm points, thereby reducing the chance of a localised error producing an alarm. Alarms that do not satisfy the premise are set to an intermediate stage, and may be re-alarmed in the next sequence. If neighbouring points lag behind by one or two frames the whole region tends to become a detection at the same time. As such, this type of error-rate filtering may be incorporated into the detection phase altogether eliminating this step. If a number of regions register a detection, a check is made to see if the lighting levels are sufficiently changed. Examples of this may include the sun behind obscured by clouds.

Shape filtering can be designed to relate to the choice of feature type. Various objects such as suitcases or cars may be recognisable by the approximate shape in the detection image. If not, one can resort to processing an incoming image of the detection region.

Algorithms

In the algorithm of Table 1 described above, the "Acquire Image" step is simply performed with the use of a monitoring camera suitable for the application at hand. Table 2 below presents pseudocode for the "Extract Features" step.

TABLE 2

FOREACH subregion (i,j) of the image
    Compute feature.
        Map feature into integer range (eg. 0...255).

In the algorithm of Table 2, the computed feature may be any feature that can be mapped onto an integer result. This feature is desirably invariant to minor changes in lighting. Also, similar features map onto similar integer values. That is to say, similar features should cluster together once converted to an integer. For example, a suitable feature value is presented in Equation [34] below.

$$F = \text{sum}\_ij(1(i,j) - \text{mean}\_1)/(\text{cum}\_ij1(i,j) + c) \quad [34]$$

In Equation [34] above, c is a small constant, and the summations are over a small neighbour of the image. The output from this is then rescaled and rounded into an integer range (for example, 0 . . . 255).

Table 3 below presents pseudocode for the "Filter Out Movement" step in the algorithm of Table 1.

TABLE 3

Set movement mask to zero.
FOREACH image subregion (i,j)
    IF feature (i,j) at time t−1 is drastically different
    to that at time t THEN
        Mark region as containing movement by setting mask (i,j) to 1.
Store current feature values for next iteration.

If feature values vary smoothly then a significant different between frames should indicate the presence of a quite different feature which is most likely associated with a moving object or sudden scene change. If the features do not differ drastically, the features are most likely associated with the same, stationary, object.

Table 4 below presents pseudocode for the "Construct or update background estimate based on features" step of the algorithm of Table 1.

TABLE 4

IF first iteration THEN
    Set status of each subregion to 'wait on background'
    Set coefficient of each distribution (i,j) to zero.
    Set counters, etc to zero.
FOREACH image subregion (i,j)
    IF mask (i,j) does not indicate movement THEN
        IF status of subregion does not indicate a 'detection' THEN
            Update Distribution.
IF complete background estimates does NOT exist
    FOREACH image subregion (i,j)
        IF distribution contains sufficient points THEN
            Find most probable feature (peak in distribution).
            Set background (i,j) to corresponding feature value.
            Change status (i,j) to ready.
    IF All subregions are ready THEN
        Indicate that complete background estimate exists.
ELSE
    Increment second counter.
    IF second counter > update delay THEN
        FOREACH image subregion (i,j)

TABLE 4-continued

Find most probable feature (i.e. peak in distribution.
            Set background (i,j) to corresponding feature value.
    Reset second counter to zero.

The techniques used to "Update distribution" and "Find most probable feature (peak in distribution)" depends upon the technique used to estimate the distribution of feature values over time. Two approaches that can be used involve histograms, or a Fourier Series-based Kernel method.

Tables 5 and 6 respectively present algorithms for "Update distribution" and "Find most probable feature (peak in distribution)" using the histogram approach. Alternate algorithms using the Kernel method are presented below in Tables 7 and 8.

TABLE 5

1. Associate feature value with a histogram bin.
2. Increment counter for that entry.
3. IF histogram contains large number of entries THEN
    Scale down histogram.

(NB. This step may be done continuously if REALS are used rather than INTEGERS).

TABLE 6

1. Find histogram bin with largest count.
2. RETURN feature value associated with that bin.

The Kernel method is based upon the Kernel Approach to Density. Rather than using a large number of discrete values to represent the distribution, the distribution can be represented by a Fourier approximation.

The KERNEL used in constructing the distribution can also be represented in this way. Thus, updating the distribution becomes one of adding some proportion of the coefficients of the kernel (shifted with respect to the incoming feature value) with the coefficients of the current density estimate.

To make a background estimate, one simply uses the Fourier approximation to find the feature with maximal probability.

TABLE 7

1. Shift kernel to suite feature value.
2. New distribution is (1 − k) * "old distribution" + K * "shifted kernel".

TABLE 8

1. Current max = 0;
2. Max val = 0;
3. FOR feature = first feature value TO last feature value
    Compute probability of feature using series approximation.
    IF probability > max val THEN
        Record max and max val.
4. RETURN max val.

The above pseudocode of Tables 7 and 8 incorporates a state space for each image region. The background estimation, detection and filtering modules can use these to alter their behaviour. For example, features of an image region detecting as a change are not fed into the distribution for that region until the state changes (otherwise an update can inadvertently cause the detected object to prematurely become part of the background estimate). Moreover, different actions can be taking place in different areas of the image. The states used here are listed directly below.

1. wait - wait on background estimate.
2. active
3. possible detection - emerging area of suspicion.
4. detection - area is detecting as a background change.
5. wait on reset - wait for user reset or object to leave. (optional)
6. reset - force reset of detection.
7. user decision - force user decision (optional)

Table 9 below presents pseudocode for the "Detect stationary objects" step in the algorithm of Table 1.

TABLE 9

```
IF first iteration THEN
        Set detection distributions to zero.
FOREACH image subregion (i,j)
        IF status is 'reset'
            Reset distribution to zero.
            Set status to 'ready'
        IF mask does not indicate movement THEN
            Update detection distribution with incoming feature value.
            IF frequency of background feature in the distribution is sufficiently
            large THEN
                Reset distribution to zero.
                IF status is not 'wait on background' THEN
                    Set status to 'ready'.
        ELSE
            IF distribution represents at least half as many image frames as the
            detection time THEN
                IF status is not 'wait' or 'possible detection' THEN
                    Change status to 'possible detection'.
                ELSEIF status is 'possible detection'.
                    Find characteristics of distribution
                    (eg. peak(s) of distribution).
                    IF peak (or other measure) exceeds
                    Specified limits THEN
                        Upgrade status to 'detection'.
                    ELSEIF distribution represents more than double the
                    detection time THEN
                        Set status to either
                        'detection' or 'user decision'
```

The background change will not have the same feature values as the background. Thus, by constituting a second distribution and comparing this with the background estimate one can detect such changes shortly after they have occurred. For example, the peak of the second distribution is likely to be different from that of the background distribution.

In the above, areas of possible change are first registered when the background has been obscured for a sufficiently long time (indicated by the size of the distribution). If the background is still present then the distribution will be continually resent, otherwise the distribution will be constructed until it is sufficiently clear that a change has occurred (for example, the peak has moved).

Again various representation of the distribution could be used.

Table 10 below presents pseudocode for the "Filter out spurious detections" step in the algorithm of Table 1.

TABLE 10

```
FOREACH detection raised
    IF sufficient neighbouring points are also flagging as 'detection' or
        'user decision' THEN
            Confirm alar status.
    ELSE
        Adjust status to 'possible detection'.
IF large regions of the detection area are in 'detection' state THEN
    Report that a significant change has occurred to the scene.
    Reduce status to 'possible detection'
```

The first step is intended to reduce false alarm rate from lone detections. This also has the advantage of delaying early detections by one or two frames so they form clear clusters. The latter test is to check to see if a detection too large to be associated with an object of interest has occurred. For example, if the camera is disturbed or malfunctioning, or if the lighting changes drastically.

Table 11 below presents pseudocode for the "Look for required detection shapes" step in the algorithm of Table 1.

TABLE 11

```
Group detection areas into blocks.
IF depth map available THEN
        Adjust for distance.
Compare blocks with shape template(s).
If sufficiently close match present THEN
        Register presence of object.
Reset non-matching regions to 'possible detection'.
```

The idea here is that a "template" would be a binary representation of how a shape, such as a suitcase, would appear in the image.

Table 12 below presents pseudocode for the "User Interface" step in the algorithm of Table 1.

TABLE 12

Display Status
IF 'detection' or 'user decision' present
    Query User Regarding Action.
    If action is reset THEN
        Set status of all 'alarm' / 'user decision' regions to 'reset'.
    ELSEIF action is ignore
        Update background distribution and background estimate based on the
            detection distribution.
        Set status of all 'alarm' / 'user decision' regions to 'wait on background' (or
            'reset' if detection in those areas should continue ASAP).
    ESLEIF action is wait
        Set status to 'wait on reset'.
    ELSEIF action is restart system
        Reset all distributions.
        Set all region status to 'wait'.

The above-discussed techniques provide an indication of changes in the background scene that are sometimes even not observable by a human operator. Actual system requirements, though, may need to be adapted for particular applications.

System adaptation is certainly required where, for example, the system is used outside in direct sunlight, the video cameras have to incorporate auto-iris functions to ensure that the individual pixels recorded are not saturated. The auto-iris function automatically adjusts the brightness to compensate for this increased luminosity, although the overall measured distribution of the individual values is still likely to be affected. Further, any camera movements of the order of a pixel may corrupt estimates of the distribution over time of the intensity of an individual pixel.

EXAMPLE

The following example represents the output of a prototype background change detection system. The techniques described herein are illustrated using a 200-second sequence of real surveillance camera imagery.

Image Layout

FIGS. 6.1 to 6.11 provide an example image sequence. Each image in the sequence is represented in a window 600 having three distinct frames. The content of each of the three frames, which represent specific processing steps in the detection process, is described below.

An input frame 610 is represented in the main screen of the left-hand side of the window 600 denotes the input imagery coming from the surveillance camera. Overlaid on this is a colour coding denoting whether the background is being computed ("blue"), a possible detection has been spotted ("green") and a detection event has occurred ("red"). Due to monochrome reproduction, blue is represented in this publication as black, green is represented as dark grey, and red is represented as light grey.

A processed image frame 620 is represented in the top right screen, and denotes a processed image that the system actually analyses. As described herein, this image is a sub-sampled representation of the original image (in this case, the sub-sampling is approximately 4 to 1). In this case, the texture feature measure is used. This texture feature tends to highlight edges and textured surfaces. An illustration of this is given in FIG. 7 below. Any blue regions within this "feature" image denote regions which the system detects as areas containing motion, detected by comparing the feature values in one frame to the next.

A background estimate frame 630 is represented in the bottom right image, and is the current background estimate based on the image inputs of the form shown in the top right image 620. In this case, a random noise pattern denotes that the system has not yet determined a background estimate for the observed scene.

Figure 7:
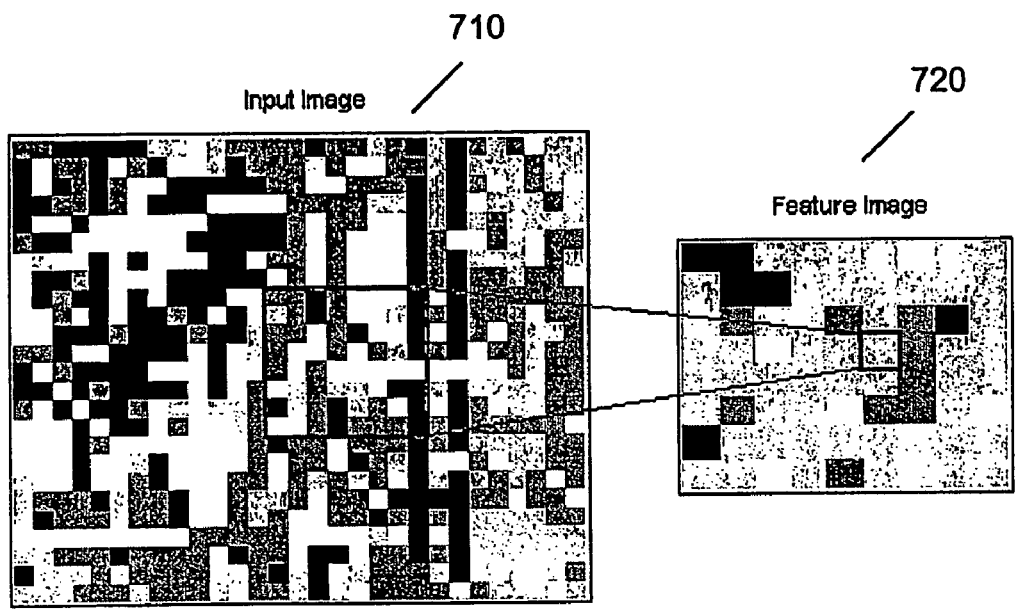
FIG. 7 is a diagram that represents conversion of an input image to a feature estimates image.

FIG. 7 represents conversion of the input image to feature estimates. Here a region of N×N pixels in the original image 710 is reduced to a single value in the "feature" image 720. The feature types that can be used are described above.

When initially starting the detection process, an estimate of the background needs to be made. For each region in the incoming feature image (top right image 620 in example frames) a histogram of the incoming values is constructed.

Figure 8:
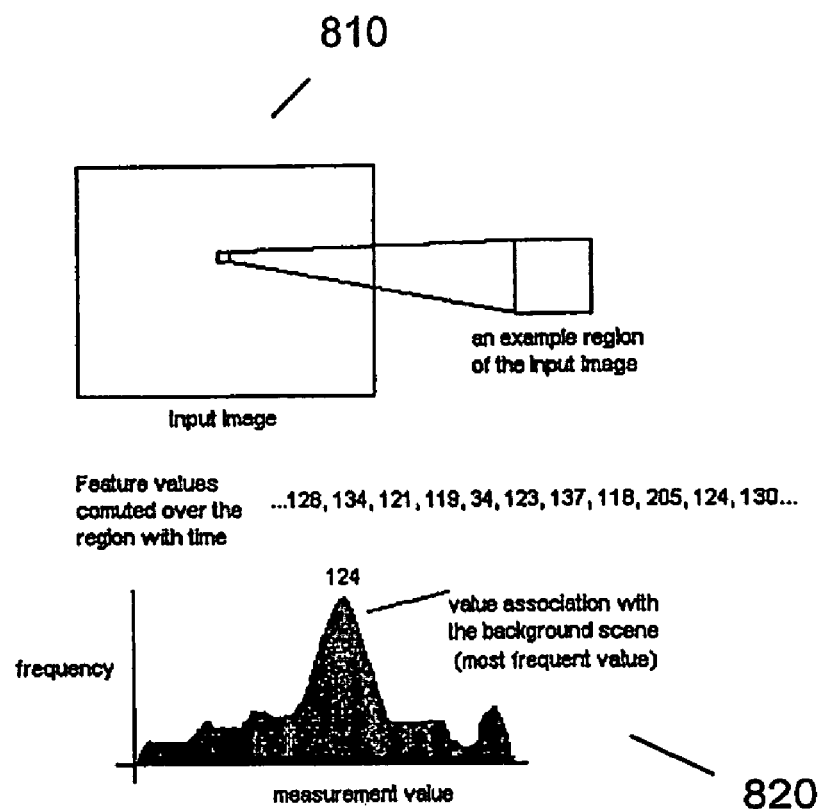
FIG. 8 is a schematic representation of how the most probable value is obtained from a analysis of a scene.

If the background is the most frequently seen pattern in each region of the image, this phenomenon provides a peak in each histogram of features. This is illustrated in FIG. 8. The scene does not have to be devoid of activity in order for this estimate to be constructed.

FIG. 8 represents estimation of the background at a particular location in the scene, based on a sequence of values over time. This process simultaneously operates over every other region in the scene. An example region 810 is represented. An estimation of the background is made using the histogram distribution 820 once a sufficient number of measurements are made, typically several times the detection time for identifying suspicious packages. Estimation of the background can be enhanced by excluding feature measurements associated with obvious movement. These areas are marked in blue in input imagery in frame 620.

Further, to compensate for gradual scene changes over time, once the initial background estimate is made, the background histograms continue to be updated, and the background estimates altered as appropriate. This must be done on a much longer timescale than the desired detection period.

Frames 1 to 3 illustrate the initial estimation process. The bottom right image in Frame 3 is the resulting background estimate based on the above processing steps. The blue colouration of the main view indicates that the system is currently determining the background prior to activating the detection portion of the processing.

Frame 1 First image seen by the detection system (T=0s)

Frame 2 A later image seen by the detection system (T=30s).
    Note the presence of several pedestrians in the scene, and the resulting motion regions in the top right image.

Frame 3 The system, just after the initial background estimate has been made (T=75s). Note that the background estimate in the bottom right has captured information about the thoroughfare and not the pedestrian traffic.

Frames 4 to 6 Insertion of the "suspicious package". At this point in time a background estimate of the scene has been made and this is now being compared against the incoming features in the top right image. As described in the patent details, this comparison is achieved by continually constructing a second histogram of the incoming features for each region and resetting it if the value associated with our current background estimate is seen a sufficient number of times.

Figure 9:
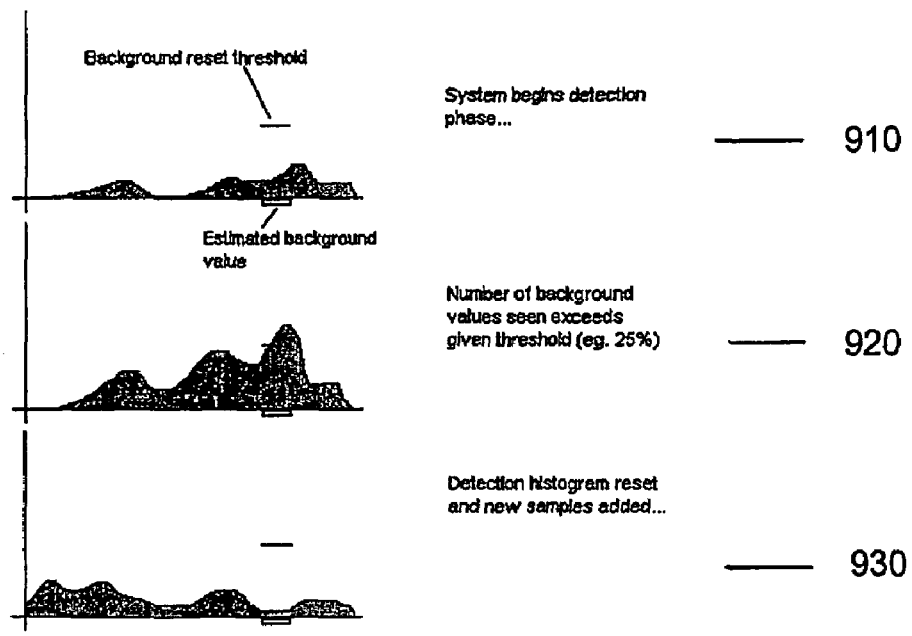
FIG. 9 is a schematic representation of three example histograms that are generated as objects pass though a scene.

FIG. 9 is an illustration of detection cycle when the background is visible. Initially, only moving pedestrians are present in the scene and the detection histograms are periodically reset as the dominant feature value matches the current background estimate. This cycle is illustrated by successive histogram distributions 910, 920 and 930. By Frame 6, however, a package is placed in the field of view of the camera. In this case in the top left corner of the scene.

Frame 4 System just prior to insertion of the suspicious package (T=100s).

Frame 5 Insertion of the suspicious package, top left (T=102s).

Frame 6 The image scene just after insertion (T=104s). Note that the system has not had time to differentiate the scene change.

Frames 7 to 8 Initial detection of the package.

As described previously, at each region in the image a histogram is being constructed which represents the features over the last few moments. In those areas not containing a static change to the scene these histograms will continue to be reset. In the region not associated with the "suspicious" package, however, these histograms are not periodically reset since the new dominant feature is no longer the same as our background estimate.

In the example frames below, regions where the background has not been reset for several frames are highlighted in green. Such regions are indicative of candidate detection regions. Note that this may not always be the case as transient objects, such as pedestrians, can obscure parts of the background for short periods of time.

Frame 7 Detection status at some later time (T=128s). At this point the package has been present for several seconds and can now be considered to be an emerging scene change. The system has highlighted it in green to denote that is has been present for at least ½ the desired detection period.

Frame 8 Detection status a little later (T=142s). Note that the package is now fully delineated as a potential scene change.

Frames 9 to 10 Detection. If the scene change (in our case the suspicious package) continues to persist in the scene, then the detection histograms will continue to develop and a new dominant, value, different to that of the background will emerge. At this point, if more time than the desired detection period has elapsed since the change occurred (this can be determined by the number of elements in the constructed histogram) and a new dominant value has arisen (that is, the mode of the distribution) then the region is marked as a background change.

Figure 10:
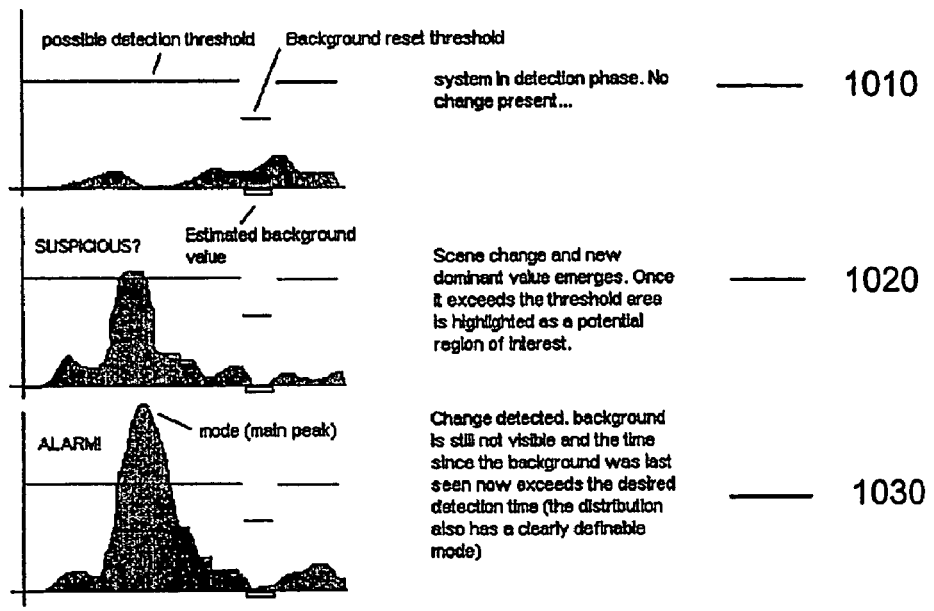
FIG. 10 represents three successive example histograms that are generated when a stationary object becomes visible.

FIG. 10 represents the detection process in the presence of a background change such as the presence of a suspicious package. These are highlighted in red in example frames 9 to 10. The three successive histogram distributions are 1010, 1020, and 1030. By frame 10, the suspicious package is clearly identified as a scene change.

Frame 9 Later (T=158s), the detection time is exceeded for several parts of the package (highlighted in red).

Frame 10 Later (T=168s). The package is now clearly detecting as a scene change.

Frames 11 to 13 Detection and transient changes. The remaining frames of this example, illustrate the continuing detection of the suspicious object. Further, a pedestrian in the top left hand corner, who initially shows up in example frame 9, has been identified as a potential region of interest (in green). By, for example, frame 13 they have moved on.

Two things should be noted here: The pedestrian was relatively stationary for an extended period of time, but not exceeding the detection period used here (some 50 seconds).

Once the pedestrian moved on, the background scene became visible again and the potential region of interest associated with them (in green) begins to disappear as the detection histograms reset (ie. sufficient values appear in the histogram which are equal to the background estimate.

Frame 11 Stationary pedestrian in top left has now been identified as a potential scene change (T=185s). They have now been stationary for some 30 seconds.

Frame 12 Immediately after the pedestrian leaves the scene (T=196s).

Frame 13 Later (T=200s), several seconds after the pedestrian moved on. The potential detection area associated with them has already begun to disappear. Additional Note: Post Processing of the Raw Detection Outputs In the example presented herein, the raw detection outputs were passed through a simple cleaning up step to remove isolated detections, as these are likely to be associated with minor scene aberrations or camera jitters etc. Here the process taken was simply to remove any detections that do not have at least one immediate neighbour.

Figure 11:
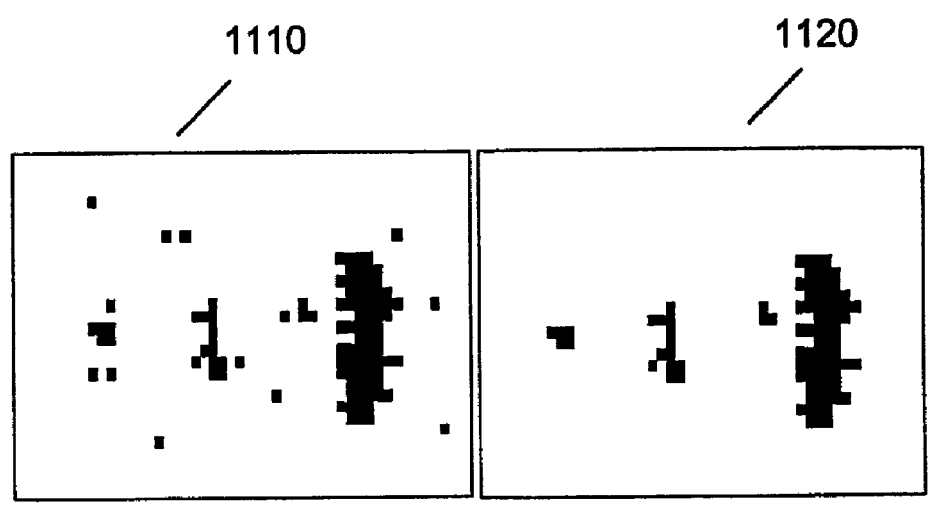
FIG. 11 represents the results of a processing procedure to remove isolated detections from further consideration.

FIG. 11 represents this step of raw detections before and after the simple cleaning up process. The raw detections are represented in frame 1110, and the processed detections after cleaning up are shown in frame 1120.

Computer Hardware and Software

Figure 12:
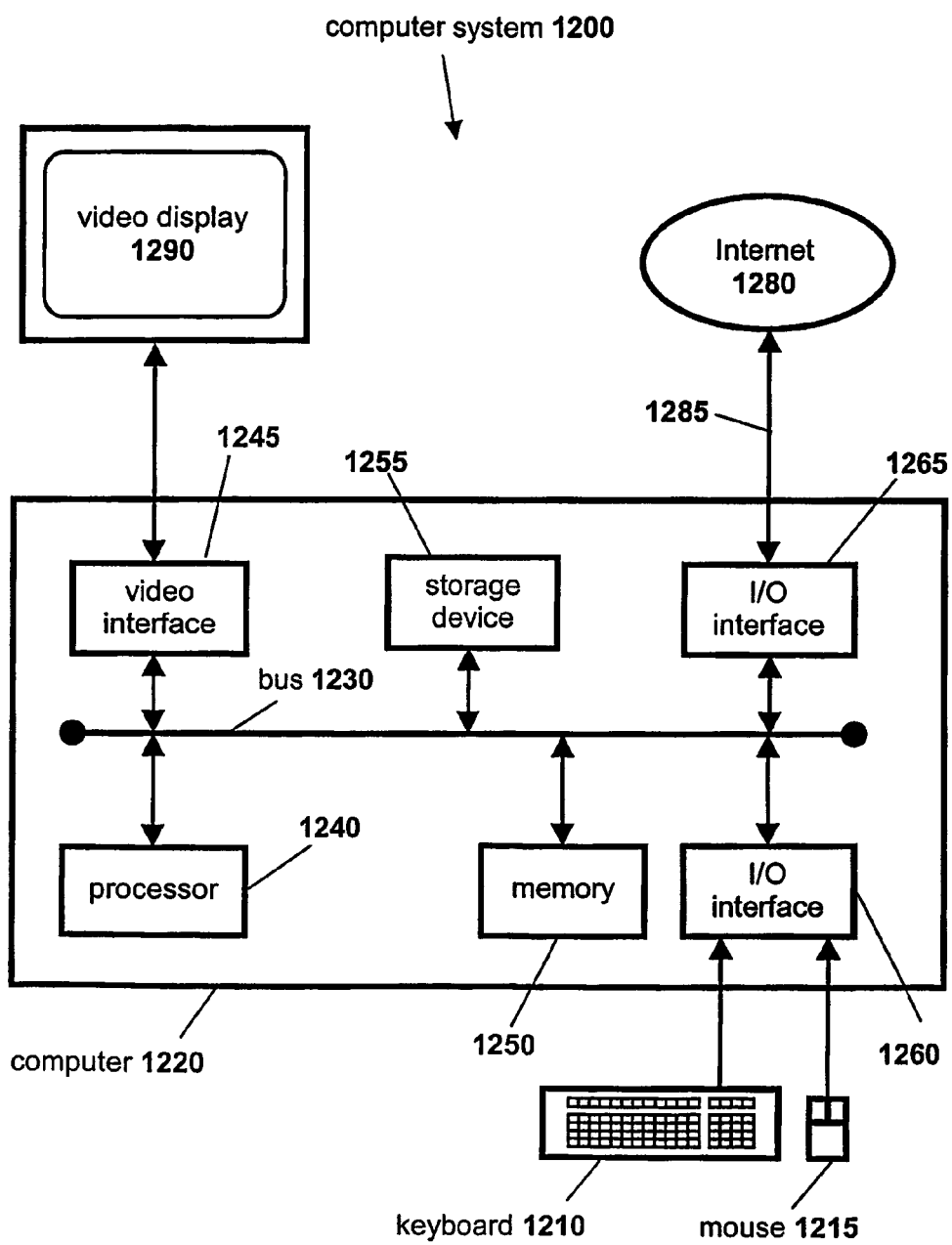
FIG. 12 is a schematic representation of a computer system suitable for performing the techniques described with reference to FIGS. 1 to 11.

FIG. 12 is a schematic representation of a computer system 1200 that can be used to implement the techniques described herein. Computer software executes under a suitable operating system installed on the computer system 1200 to assist in performing the described techniques. This computer software is programmed using any suitable computer programming language, and may be thought of as comprising various software code means for achieving particular steps.

The components of the computer system 1200 include a computer 1220, a keyboard 1210 and mouse 1215, and a video display 1290. The computer 1220 includes a processor 1240, a memory 1250, input/output (I/O) interfaces 1260, 1265, a video interface 1245, and a storage device 1255.

The processor 1240 is a central processing unit (CPU) that executes the operating system and the computer software executing under the operating system. The memory 1250 includes random access memory (RAM) and read-only memory (ROM), and is used under direction of the processor 1240.

The video interface 1245 is connected to video display 1290 and provides video signals for display on the video display 1290. User input to operate the computer 1220 is provided from the keyboard 1210 and mouse 1215. The storage device 1255 can include a disk drive or any other suitable storage medium.

Each of the components of the computer 1220 is connected to an internal bus 1230 that includes data, address, and control buses, to allow components of the computer 1220 to communicate with each other via the bus 1230.

The computer system 1200 can be connected to one or more other similar computers via a input/output (I/O) interface 1265 using a communication channel 1285 to a network, represented as the Internet 1280.

The computer software may be recorded on a portable storage medium, in which case, the computer software program is accessed by the computer system 1200 from the storage device 1255. Alternatively, the computer software can be accessed directly from the Internet 1280 by the computer 1220. In either case, a user can interact with the computer system 1200 using the keyboard 1210 and mouse 1215 to operate the programmed computer software executing on the computer 1220.

Other configurations or types of computer systems can be equally well used to implement the described techniques. The computer system 1200 described above is described only as an example of a particular type of system suitable for implementing the described techniques.

CONCLUSION

A method, computer software, and a computer system are each described herein in the context of motion detection. Various alterations and modifications can be made to the techniques and arrangements described herein, as would be apparent to one skilled in the relevant art.

The invention claimed is:

1. A method of detecting a change to a background of a visual scene, the method comprising, for a current image of the visual scene:
   extracting a feature value from at least one sub-region of the current image;
   updating a detection distribution using the extracted feature value;
   determining whether a match exists between the updated detection distribution and a background distribution;
   comparing with a predetermined threshold, if a match is not determined, the number of images since the previously determined match; and
   detecting, based on the comparison, a change to the background of the visual scene,
   wherein the extracting, updating, determining, comparing, and detecting are performed by a processor.

2. The method according to claim 1, further comprising:
   resetting, if a match is determined, the detection distribution.

3. The method according to claim 1, wherein the determining comprises:
   determining whether a most prominent feature value in the background distribution is sufficiently prominent in the updated detection distribution.

4. The method according to claim 1, wherein the detecting comprises:
   flagging, based on the comparison, a possible change to the background of the visual scene;
   comparing, based on the flagging, the updated detection distribution with a predetermined limit;
   detecting, based on the further comparison, a change to the background of the visual scene.

5. The method according to claim 4, further comprising:
   determining whether the number of images since the previously determined match exceeds a second threshold; and
   detecting, based on the determination, a change to the background of the visual scene.

6. The method according to claim 1, further comprising:
   detecting whether the sub-region contains motion; and
   carrying out the updating, determining, comparing, and detecting dependent on whether the sub-region contains motion.

7. The method according to claim 6, wherein the detecting of motion comprises determining whether the extracted feature is substantially different to the feature extracted from the previous image.

8. The method according to claim 1, wherein the extracted feature is a regularized pattern feature.

9. The method according to claim 1, further comprising updating the background distribution using the extracted feature.

10. The method according to claim 1, further comprising comparing the shape of a plurality of adjacent sub-regions for which a change to the background has been detected with a shape template.

11. The method according to claim 1, wherein the background distribution and the detection distribution are histograms of extracted feature values.

12. A computer readable storage medium, having recorded thereon computer software code for performing a method of detecting a change to a background of a visual scene, comprising, for a current image of the visual scene:
   extracting a feature value from at least one sub-region of the current image;
   updating a detection distribution using the extracted feature value;
   determining whether a match exists between the updated detection distribution and a background distribution;
   comparing with a predetermined threshold, if a match is not determined, the number of images since the previously determined match; and
   detecting, based on the comparison, a change to the background of the visual scene.

13. A computer system for detecting a change to a background of a visual scene, the computer system comprising:
   an input port for accepting images of the scene into which objects enter and from which objects leave; and
   process means for, for a current image of the visual scene:
   extracting a feature value from at least one sub-region of the current image;
   updating a detection distribution using the extracted feature value;
   determining whether a match exists between the updated detection distribution and a background distribution;
   comparing with a predetermined threshold, if a match is not determined, the number of images since the previously determined match; and
   detecting, based on the comparison, a change to the background of the visual scene.

14. The method according to claim 1, wherein the comparing comprises:
   incrementing a counter; and
   comparing the counter with the predetermined threshold.

15. The method according to claim 14, further comprising resetting, if a match is determined, the counter to zero.

* * * * *